Patented Nov. 7, 1939

2,178,584

UNITED STATES PATENT OFFICE 2,178,584

MANUFACTURE OF DIOLEFINS

Aristid V. Grosse, Chicago, Ill., assignor to Universal Oil Products Company, Chicago, Ill., a corporation of Delaware No Drawing. Application November 30, 1937, Serial No. 177,282

10 Claims. (Cl. 260—680)

This invention relates more particularly to the treatment of aliphatic or straight chain hydrocarbons which are characterized by unsaturation to the extent of having one double bond in the molecule. It is directed primarily to the treatment of such mono-olefinic hydrocarbons which have less than six carbon atoms in straight chain arrangement including ethylene, propylene, butylenes and amylenes, although it may also be applied to hydrocarbons having six or more carbon atoms in straight chain arrangement.

In a more specific sense, the invention is concerned with a new and improved type of process for controllably increasing the degree of unsaturation in hydrocarbons of the character mentioned so that a mono-olefinic hydrocarbon may be converted into a diolefin with a practical minimum of undesirable side reactions.

The present process is concerned with the more efficient utilization of mono-olefinic hydrocarbons of the types mentioned above in that they are converted by dehydrogenation into compounds of a more reactive character which are readily utilizable in the production of polymers and miscellaneous hydrocarbon derivatives useful in the arts.

The present process for manufacturing diolefins from mono-olefins is related to the synthetic rubber problem in that butadienes and their alkylated derivatives are producible from 4 and 5 carbon atom aliphatic hydrocarbons and these butadienes are polymerizable to form high molecular weight polymers closely resembling natural rubber.

In experimenting with methods and conditions for converting mono-olefinic hydrocarbons into diolefins by dehydrogenation, a considerable number of catalytic materials have been tried with greater or lesser effectiveness, since it has been found generally that better results in the matter of yield of the more unsaturated diolefins without the formation of undesirable liquid and gaseous by-products are obtainable by the use of catalysts rather than by the use of heat alone, and furthermore that under proper catalytic influences temperatures, pressures, and time factors, are lower, so that less expensive apparatus may be employed and greater capacities insured.

In one specific embodiment the present invention comprises the treatment of mono-olefinic hydrocarbons for the dehydrogenation thereof to diolefins by subjecting said hydrocarbons at elevated temperatures and subatmospheric pressures to contact with solid granular catalysts comprising major proportions by weight of carrying material of relatively low catalytic activity supporting minor proportions by weight of compounds of the elements in the left-hand column of group VI of the periodic table, and preferably the oxides thereof which have relatively high catalytic activity in furthering simple dehydrogenation reactions.

The present invention is characterized by the use of particular catalytic materials and suitable combinations of temperature, pressure, and time of contact to control the character and extent of the dehydrogenation of mono-olefinic hydrocarbons to produce diolefins with a minimum of undesirable by-products. Temperatures from 500 to 700° C., absolute pressures of approximately 0.25 atmosphere and times of contact of less than 2 seconds constitute in general the best ranges of conditions for the present type of reactions.

In the present instance, the catalysts which are preferred for selectivity dehydrogenating mono-olefinic hydrocarbons have been evolved as the result of a large amount of investigation with catalysts having a dehydrogenating action upon various types of hydrocarbons such as, for example, those which are encountered in the fractions produced in the distillation and/or pyrolysis of petroleum and other naturally occurring hydrocarbon oil mixtures. The criterion of an acceptable dehydrogenating catalyst is that it shall split off hydrogen without inducing either scission of the bonds between carbon atoms or carbon separation. The selection of catalysts and conditions favoring the selective production of diolefins from mono-olefins is particularly difficult on account of the general reactivity of the charging materials.

It should be emphasized that in the field of catalysis there have been very few rules evolved which would enable the prediction of what materials will catalyze a given reaction. Most of the catalytic work has been done on a purely empirical basis, though at times certain groups of elements or compounds have been found to be more or less equivalent in accelerating certain types of reactions. For example, the noble metals, platinum and palladium, have been found to be effective in dehydrogenating reactions, particularly in dehydrogenating naphthenes to form aromatics, but these metals are expensive and easily poisoned by traces of sulfur so that their use is considerably limited in petroleum hydrocarbon reactions.

The present invention is characterized by the use of a particular group of composite catalytic materials which employ as their base catalysts or carriers certain refractory oxides and silicates which in themselves may have some slight specific catalytic ability in the dehydrogenating reactions but which are improved greatly in this respect by the addition of certain promoters or secondary catalysts in minor proportions, which comprises in the present instance the compounds and preferably the oxides of the elements in the left-hand column of group VI of the periodic table including chromium, molybdenum, tungsten and uranium. The base supporting materials for these compounds are preferably of a rugged and refractory character capable of withstanding the severe use to which the catalysts are put in regard to temperature during service and in regeneration by means of air or other oxidizing gas mixtures after they have become fouled with carbonaceous deposits after a period of service. As examples of materials which may be employed in granular form as supports for the preferred catalytic substances may be mentioned the following:

Magnesium oxide
Aluminum oxide
Bauxite
Bentonite clays
Glauconite (greensand)
Montmorillonite clays
Kieselguhr
Crushed silica
Crushed firebrick The active compounds or promoters which are used in the catalyst composites according to the concepts of the present invention include generally compounds and particularly oxides of chromium, molybdenum, tungsten and uranium which constitute a natural group since they are the elements in the lefthand column of group VI of the periodic table. While the compounds and particularly the oxides of these elements are effective catalysts in the dehydrogenation reactions, it is not intended to infer that the different compounds of any one element or the corresponding compounds of the different elements are exact equivalents in their catalytic activity. Furthermore, the elements chromium, molybdenum, and tungsten are of more common occurrence and more readily obtainable whereas the element uranium is rare and expensive and not frequently used in practice.

In general practically all of the compounds of the preferred elements will have some catalytic activity in dehydrogenating olefinic hydrocarbons though as a rule the oxides and particularly the lower oxides are the best catalysts. Catalyst composites may be prepared by utilizing the soluble compounds of the elements in aqueous solutions from which they are absorbed by prepared granular carriers or from which they are deposited upon the carriers by evaporation of the solvent. The invention further comprises the use of catalyst composites made by mechanically mixing relatively insoluble compounds with carriers either in the wet or the dry condition. In the following paragraphs some of the compounds of the elements listed above are given which may be used to add catalytic material to carriers. The known oxides of these elements are also listed.

Chromium

The preferred catalysts in the case of chromium comprise essentially mixtures of major amounts of inert carriers and minor amounts of compounds of chromium such as for example, the oxides $CrO_3$, $CrO_2$, and particularly the sesquioxide $Cr_2O_3$, which results from the reduction of the two higher oxides. The oxides mentioned are particularly efficient as catalysts for the present types of reactions but the invention is not limited to their use but may employ any of the catalytically active compounds of chromium which may be either deposited upon the carriers from aqueous or other solutions in the course of the preparation of the composites or which may be mechanically admixed therewith either in the wet or the dry condition. Such compounds as chromic acid $H_2CrO_4$ prepared by dissolving the trioxide in water, and chromium nitrate $Cr(NO_3)_3$, are readily soluble in water at ordinary temperatures and their solutions are therefore utilizable for adding compounds to various carriers which can be later ignited to leave a residue of the trioxide which is readily reducible by hydrogen at 250° C. to form the green sesquioxide and is ordinarily reduced in the early stage of a run on the vapors of some paraffin hydrocarbon. Alternatively, if desired, chromium hydroxides may be precipitated from aqueous solutions onto suspended particles of carriers by the use of such precipitants as the hydroxides and carbonates of the alkali metals or ammonium. Among other soluble compounds which may be added to carriers from aqueous solution may be mentioned chromium ammonium sulfate, chromium chlorides, chromium fluoride, chromium potassium cyanide, chromium sulfates, double salts of chromium in the alkali metals such as chromium potassium sulfate and the alkali metal salts of the various acids of chromium.

Molybdenum

It is good practice to utilize catalysts comprising 2 to 5 per cent by weight of the lower oxides of molybdenum, such as the sesquioxide $Mo_2O_3$ and the dioxide $MoO_2$. While the oxides mentioned are particularly efficient as catalysts for the present types of reactions, the invention is not limited to their use but may employ other compounds of molybdenum. Numerous readily soluble molybdenum compounds may be used in solution to add the catalysts to the carrier. As examples of such soluble compounds may be mentioned molybdenum pentachloride in hydrochloric acid solution, molybdic oxide dissolved in aqueous ammonia or nitric acid and ammonium molybdate. Other soluble compounds are the tetrabromide, the oxychloride, and the basic thiocyanate. Compounds of molybdenum which are insoluble in water or other ordinary solvents may be mixed mechanically with the alumina either in the dry or moist condition.

Tungsten

Oxides of tungsten, such as the sesquioxide $W_2O_3$ and the dioxide $WO_2$ which result from the reduction of the trioxide $WO_3$ are particularly efficient as catalysts for the present types of reactions, though the invention is not limited to their use but may employ other compounds of tungsten. Tungsten trioxide dissolves readily in aqueous ammonia solutions and may thus be conveniently used as an ultimate source of tungstic acids, which correspond to various degrees of hydration of the trioxide and which may be ignited to form the trioxide. Alternately the tungstic acids may be precipitated from solutions in water by the use of ammonium or alkali metal hydroxides or carbonates as precipitants, the hydroxide being later ignited to form mixtures of the trioxide and the dioxide, which may undergo reduction by hydrogen or the gases and vapors in contact with the catalyst in the normal operation of the process.

Uranium

In regard to uranium, which is the heaviest member of the present natural group of elements whose compounds are preferred as catalysts, it may merely be stated that while this element furnishes catalytic compounds having a relatively high order of activity, its scarcity and cost naturally precludes its extensive use in practice. Uranium shows a series of oxides including the dioxide $UO_2$, a trioxide $UO_3$, a hydrated peroxide $UO_4.2H_2O$ and an oxide $U_3O_8$ characteristic of pitchblende. Any of these oxides may be used as catalysts as well as some of the other compounds of this element.

In regard to the base catalytic materials which are preferably employed according to the present invention, some precautions are necessary to insure that they possess proper physical and chemical characteristics before they are impregnated with the promoters to render them more efficient. In regard to magnesium oxide, which may be alternatively employed, this is most conveniently prepared by the calcination of the mineral magnesite which is most commonly encountered in a massive or earthy variety and rarely in crystal form, the crystals being usually rhombohedral. The mineral is of quite common occurrence and readily obtainable in quantity at a reasonable figure. The pure compound begins to decompose to form the oxide at a temperature of 350° C., though the rate of decomposition only reaches a practical value at considerably higher temperatures, usually of the order of 800° C. to 900° C. Magnesite is related to dolomite, the mixed carbonate of calcium and magnesium, which latter mineral, however, is not of as good service as the relatively pure magnesite in the present instance. Magnesium carbonate prepared by precipitation or other chemical methods may be used alternatively in place of the natural mineral. It is not necessary that the magnesite be completely converted to oxide but as a rule it is preferable that the conversion be at least over 90%, that is so that there is less than 10% of the carbonate remaining in the ignited material.

Aluminum oxide itself prepared by the controlled calcination of natural carbonate or hydrate ores, or by chemical precipitation methods, is in itself a fairly good catalyst for accelerating the rate of dehydrogenation of olefins over a considerable temperature range. However, an extensive series of experiments has demonstrated that this catalytic property is greatly improved by the addition of promoting substances in minor amounts, usually of the order of less than 10% by weight of the oxide.

Two hydrated oxides of aluminum occur in nature, to wit, bauxite having the formula $Al_2O_3.2H_2O$ and diaspore having the formula $Al_2O_3.H_2O$. Of these two minerals only the corresponding oxide from the bauxite is suitable for the manufacture of the present type of catalysts and this material in some instances has given the best results of any of the base compounds whose use is at present contemplated. The mineral dawsonite having the formula $$Na_3Al(CO_3)_3.2Al(OH)_3$$

is another mineral which may be used as a source of aluminum oxide, the calcination of this mineral giving an alkalized aluminum oxide which is apparently more effective as a support in that the catalyst is more easily regenerated after a period of service. Alumina in the form of powdered corundum is not suitable as a base.

It is best practice in the final steps of preparing aluminum oxide as a base catalyst to ignite it for some time at temperatures within the approximate range of from 600 to 750° C. This probably does not correspond to complete dehydration of the hydroxides but apparently gives a catalytic material of good strength and porosity so that it is able to resist for a long period of time the deteriorating effects of the service and regeneration periods to which it is subjected. In the case of the clays which may serve as base catalytic materials for supporting promoters, the better materials are those which have been acid-treated to render them more siliceous. These may be pelleted or formed in any manner before or after the addition of the promoter catalyst since ordinarily they have a tendency to crumble under mechanical pressure to make a high percentage of fines. The addition of certain of the promoters, however, exerts a binding influence so that the formed materials may be employed without fear of structural deterioration in service.

The most general method for adding promoting materials to the preferred base catalysts, which if properly prepared have a high adsorptive capacity, is to stir the prepared granules of from approximately 4 to 20 mesh into solutions of salts which will yield the desired promoting compounds on ignition under suitable conditions. In some instances the granules may be merely stirred in slightly warm solutions of salts until the dissolved compounds have been retained on the particles of absorption or occlusion, after which the particles are separated from the excess solvent by settling or filtration, washed with water to remove excess solution, and then ignited to produce the desired residual promoter. In cases of certain compounds of relatively low solubility it may be necessary to add the solution in successive portions to the adsorbent base catalyst with intermediate heating to drive off solvent in order to get the required quantity of promoter deposited upon the surface and in the pores of the base catalyst. The temperatures used for drying and calcining after the addition of the promoters from solutions will depend entirely upon the individual characteristics of the compound added and no general ranges of temperature can be given for this step.

In some instances promoters may be deposited from solution by the addition of precipitants which cause the deposition of dissolved materials upon the catalyst granules. As a rule methods of mechanical mixing are not preferable, though in some instances in the case of hydrated or readily fusible compounds there may be mixed with the proper proportions of base catalysts and uniformly distributed during the condition of fusing or fluxing.

In regard to the relative proportions of base catalyst and promoting materials it may be stated in general that the latter are generally less than 10% by weight of the total composites. The effect upon the catalytic activity of the base catalysts caused by varying the percentage of any given compound or mixture of compounds deposited thereon is not a matter for exact calculation but more one for determination by experiment. Frequently good increases in catalytic effectiveness are obtainable by the deposition of as low as 1% or 2% of a promoting compound upon the surface and in the pores of the base catalyst, though the general average is about 5%.

In practicing the dehydrogenation of mono-olefinic hydrocarbons according to the present process a solid composite catalyst prepared according to some one of the foregoing alternative methods is used as a filler in a reaction tube or chamber in the form of particles of graded size or small pellets and the hydrocarbon gas or vapor to be dehydrogenated is passed through the catalyst after being heated to the proper temperature, under a definite pressure and for a time of contact adapted to produce the results desired. The catalyst tube may be heated exteriorly if desired to maintain the proper reaction temperature.

As an alternative and frequently preferable method of operation with the present types of catalysts, they may be used as refractory filling material in the form of bricks or special forms or as a coating upon bricks or other forms in furnaces of the regenerative type which are alternately blasted and then used as heating means to effect the desired conversion reactions. In such an operation a regenerative chamber may be filled with alternate layers of ordinary non-catalytic refractory forms and layers of catalytic material. In this method of operation the heat necessary for the dehydrogenation reactions is added during the regenerating period which must be employed in any event to periodically remove carbonaceous deposits from the catalyst surfaces.

It has been found essential to the efficient and selective dehydrogenation of mono-olefinic hydrocarbons when using the present types of catalysts that the gaseous or vaporized materials be substantially free from water vapor. If appreciable amounts of steam are present the catalytic activity is adversely affected so that the active life is shortened, the need for regeneration becomes more frequent and a point is more quickly reached where regeneration is no longer effective. The reasons for this phenomenon are not entirely clear but may possibly be due to a certain degree of hydration of the more active catalytic components of the mixtures or the hydration of such supports as aluminum or magnesium oxides.

The exit gases from the tube or chamber may be passed through selective absorbents to combine with or absorb the diolefins produced. The diolefinic content of the total products may be catalytically condensed or polymerized directly to form synthetic rubber products as already mentioned. After the diolefins have been removed the residual gases may be recycled for further dehydrogenating treatment with or without removal of hydrogen.

Members of the present group of catalysts are selective in removing two hydrogen atoms from mono-olefinic hydrocarbon molecules to produce the corresponding diolefins without furthering to any great degree undesirable side reactions, and because of this show an unusually long period of activity in service as will be shown in later examples. When, however, their activity begins to diminish it is readily regenerated by the simple expedient of oxidizing with air or other oxidizing gas at a moderately elevated temperature, usually within the range employed in the dehydrogenating reactions. This oxidation effectively removes traces of carbon deposits which contaminate the surface of the particles and decrease their efficiency. It is characteristic of the present types of catalysts that they may be repeatedly regenerated without material loss of porosity or catalyzing efficiency.

The following examples are given to indicate the selective character of the dehydrogenation reactions produced by catalysts comprised within the present group, though they are merely selected from a large number and not given with the intent of unduly limiting the scope of the invention.

Example I

In making up the catalyst for the catalytic dehydrogenating operation, 100 parts by weight of 6 to 10 mesh activated alumina particles were added to 50 parts by weight of a 10 percent solution of chromium trioxide in water at room temperature. After stirring for a few moments, the small amount of supernatant liquid was decanted and the particles were dried first at a temperature of 100° C., and then at approximately 220–230° C. By this procedure, the major portion of the dissolved chromium trioxide was absorbed by the alumina particles.

Using the catalyst prepared in the above manner a mixture of approximately equal parts of alpha and beta butenes was dehydrogenated at a temperature of 600° C., a pressure of 0.25 atmosphere and a contact time of 0.65 second. In the products which were condensed by cooling at $-80°$ C. 1,3-butadiene was found to be present in a concentration of about 35 per cent, corresponding to a yield of about 20 per cent based on the materials charged. The identification was made by means of the reaction with maleic anhydride, and further identification was made by the formation of the compound: 1,2,3,4-tetrabromobutane.

Example II

A catalyst was prepared by first adding chromium trioxide to an activated alumina by making a paste with a solution of chromic acid, evaporating to dryness and then reducing the trioxide to the sesquioxide at a temperature of approximately 375° C. The catalyst as finally prepared comprised 95% by weight of aluminum oxide, 4% by weight of chromium sesquioxide and 2% by weight of water.

Using the above catalyst the isomeric amylene isopropyl ethylene was passed over the catalyst at a temperature of 600° C., an absolute pressure of 0.25 atmosphere and a contact time of 0.45 second. The principal product was isoprene which was produced in a yield of about 22% by weight as the result of a single passage through the catalyst mass. This isoprene was positively identified by the isolation of cis-5-methyl—$\Delta^4$-tetrahydrophthalic anhydride (which had a melting point of 61–62° C.) by the reaction between the recovered liquids and maleic anhydride. The liquid products reacted with sodium to produce a viscous rubber-like material.

Example III

The procedure in the manufacture of the catalyst was to dissolve ammonium tungstate in water and utilize this solution as a means of adding tungsten oxides to a carrier. 15 parts by weight of ammonium tungstate was dissolved in about 100 parts by weight of water and the solution was then added to about 250 parts by weight of activated alumina which had been produced by calcining bauxite at a temperature of about 700° C., followed by grinding and sizing to produce particles of approximately 8–12 mesh. Using the proportions stated the alumina exactly absorbed the solution and the particles were first dried at 100° C. for about two hours and the temperature was then raised to 350° C. in a period of eight hours. After this calcining treatment the particles were placed in a reaction chamber and the tungsten oxides reduced in a current of hydrogen at about 500° C., when they were then ready for service.

Using the catalyst described above a mixture of approximately equal parts of alpha and beta butylenes was dehydrogenated at a temperature of 610° C., a pressure of 0.25 atmosphere and a contact time of 0.75 second. In the products which were condensed by cooling at −80° C. 1,3-butadiene was found to be present in a concentration of about 32 per cent, corresponding to a yield of about 19 per cent based on the materials charged. The identification was made by means of the reaction with maleic anhydride, and further identification was made by the formation of the compound: 1,2,3,4-tetrabromobutane.

The foregoing specification and examples show clearly the character of the invention and the results to be expected in its application to the dehydrogenation of mono-olefinic hydrocarbons, although neither section is intended to be unduly limiting.

I claim as my invention:

1. A process for converting mono-olefins having less than six carbon atoms in straight chain arrangement into diolefins which comprises subjecting the mono-olefin under dehydrogenating conditions to the action of a solid catalyst comprising a compound of a metal from the left hand column of group VI of the periodic table and selected from the class consisting of chromium, molybdenum and tungsten.

2. A process for converting mono-olefins having less than six carbon atoms in straight chain arrangement into diolefins which comprises subjecting the mono-olefin under dehydrogenating conditions to the action of a solid catalyst comprising an oxide of a metal from the left hand column of group VI of the periodic table and selected from the class consisting of chromium, molybdenum and tungsten.

3. A process for converting mono-olefins having less than six carbon atoms in straight chain arrangement into diolefins which comprises subjecting the mono-olefin under dehydrogenating conditions to the action of an aluminum oxide catalyst supporting a relatively small amount of a compound of a metal from the left hand column of group VI of the periodic table and selected from the class consisting of chromium, molybdenum and tungsten.

4. A process for converting mono-olefins having less than six carbon atoms in straight chain arrangement into diolefins which comprises subjecting the mono-olefin under dehydrogenating conditions to the action of an aluminum oxide catalyst supporting a relatively small amount of an oxide of a metal from the lefthand column of group VI of the periodic table and selected from the class consisting of chromium, molybdenum and tungsten.

5. A process for converting mono-olefins having less than six carbon atoms in straight chain arrangement into diolefins which comprises subjecting the mono-olefin at a temperature of the order of 500 to 700° C. under pressure of about 0.25 atmosphere absolute and for a contact time of less than 2 seconds to the action of an aluminum oxide catalyst supporting a relatively small amount of an oxide of a metal from the left hand column of group VI of the periodic table and selected from the class consisting of chromium, molybdenum and tungsten.

6. A process for converting mono-olefins having less than six carbon atoms in straight chain arrangement into diolefins which comprises subjecting the mono-olefin under dehydrogenating conditions to the action of a solid catalyst comprising an oxide of chromium.

7. A process for converting mono-olefins having less than six carbon atoms in straight chain arrangement into diolefins which comprises subjecting the mono-olefin under dehydrogenating conditions to the action of an aluminum oxide catalyst supporting a relatively small amount of an oxide of chromium.

8. A process for the dehydrogenation of mono-olefinc hydrocarbons having less than six carbon atoms in straight chain arrangement to produce diolefins therefrom, which comprises subjecting said mono-olefinic hydrocarbons at elevated temperatures of the order of 500–700° C., pressures of the order of 0.25 atmosphere absolute and times of less than 2 seconds to contact with a solid granular catalyst comprising essentially a major proportion by weight of aluminum oxide which has relatively low catalytic activity supporting an oxide of chromium which has relatively high catalytic activity.

9. A process for the dehydrogenation of mono-olefinic hydrocarbons having less than six carbon atoms in straight chain arrangement to produce diolefins therefrom, which comprises subjecting said mono-olefinic hydrocarbons at elevated temperatures of the order of 500–700° C., pressures of the order of 0.25 atmosphere absolute and times of less than 2 seconds to contact with a solid granular catalyst comprising essentially a major proportion by weight of aluminum oxide which has relatively low catalytic activity supporting an oxide of molybdenum which has relatively high catalytic activity.

10. A process for the dehydrogenation of mono-olefinic hydrocarbons having less than six carbon atoms in straight chain arrangement to produce diolefins therefrom, which comprises subjecting said mono-olefinic hydrocarbons at elevated temperatures of the order of 500–700° C., pressures of the order of 0.25 atmosphere absolute and times of less than 2 seconds to contact with a solid granular catalyst comprising essentially a major proportion by weight of aluminum oxide which has relatively low catalytic activity supporting an oxide of tungsten which has relatively high catalytic activity.

ARISTID V. GROSSE.